United States Patent
Park et al.

(10) Patent No.: US 8,625,044 B2
(45) Date of Patent: Jan. 7, 2014

(54) LIQUID CRYSTAL DISPLAY APPARATUS

(75) Inventors: Ki-Sik Park, Yongin (KR); Kon-Ho Lee, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 188 days.

(21) Appl. No.: 13/341,023

(22) Filed: Dec. 30, 2011

(65) Prior Publication Data
US 2013/0002977 A1  Jan. 3, 2013

(30) Foreign Application Priority Data

Jun. 30, 2011  (KR) .................. 10-2011-0064983

(51) Int. Cl.
*G02F 1/1333*  (2006.01)
(52) U.S. Cl.
USPC ............................................. 349/58
(58) Field of Classification Search
USPC ............................................. 349/58
See application file for complete search history.

(56) References Cited

U.S. PATENT DOCUMENTS

| | | | |
|---|---|---|---|
| 7,481,567 B2* | 1/2009 | Cho et al. | 362/632 |
| 2005/0062902 A1* | 3/2005 | Fukayama | 349/58 |
| 2006/0139510 A1* | 6/2006 | Liao et al. | 349/58 |
| 2010/0188607 A1* | 7/2010 | Park et al. | 349/62 |
| 2011/0279750 A1 | 11/2011 | Jeong et al. | |

FOREIGN PATENT DOCUMENTS

| | | |
|---|---|---|
| KR | 10-2007-0076736 A | 7/2007 |
| KR | 10-2008-0038592 A | 5/2008 |
| KR | 10-2010-0047590 A | 5/2010 |
| KR | 10-1084201 B1 | 11/2011 |

* cited by examiner

*Primary Examiner* — Timothy L Rude
(74) *Attorney, Agent, or Firm* — Lee & Morse, P.C.

(57) ABSTRACT

A liquid crystal display apparatus includes a liquid crystal panel, a printed circuit board (PCB) configured to generate driving signals for driving the liquid crystal panel, a chassis disposed on the liquid crystal panel, a light source disposed between the liquid crystal panel and the chassis, a main flexible printed circuit board (FPC) having a first end connected to the liquid crystal panel and a second end connected to the PCB, the main FPC including at least one grounding pattern between the liquid crystal panel and the PCB, and a conductive member contacting the chassis and the at least one grounding pattern.

16 Claims, 4 Drawing Sheets

LIQUID CRYSTAL DISPLAY APPARATUS

CROSS-REFERENCE TO RELATED PATENT APPLICATION

This application claims the benefit of Korean Patent Application No. 10-2011-0064983, filed on Jun. 30, 2011, in the Korean Intellectual Property Office, the disclosure of which is incorporated herein in its entirety by reference.

BACKGROUND

1. Field

Example embodiments relate to a liquid crystal display apparatus, and more particularly, to a liquid crystal display apparatus having minimized defects caused by static electricity and having improved durability.

2. Description of the Related Art

Recently, display devices have been replaced with thin flat panel display apparatuses that may be portable. Among flat panel display apparatuses, liquid crystal display apparatuses have been highlighted due to low power consumption and low electromagnetic wave generation.

A liquid crystal display apparatus includes a liquid crystal panel that is formed by injecting a liquid crystal layer between two substrates and coupling the two substrates by using a sealing member, a light source, a chassis, a printed circuit board (PCB), and a flexible printed circuit board (FPC). However, each of components in the liquid crystal display apparatus may have defects caused due to static electricity.

SUMMARY

Example embodiments provide a liquid crystal display apparatus capable of preventing defects caused by static electricity, and having improved durability.

According to an aspect of the example embodiments, there may be provided a liquid crystal display apparatus, including a liquid crystal panel, a printed circuit board (PCB) configured to generate driving signals for driving the liquid crystal panel, a chassis disposed on the liquid crystal panel, a light source disposed between the liquid crystal panel and the chassis, a main flexible printed circuit board (FPC) having a first end connected to the liquid crystal panel and a second end connected to the PCB, the main FPC including at least one grounding pattern between the liquid crystal panel and the PCB, and a conductive member contacting the chassis and the at least one grounding pattern.

The conductive member may be a tape.

The conductive member may be a dried conductive paste.

The main FPC may include the at least one grounding pattern on a base member, and a protective layer on the at least one grounding pattern, the protective layer having a penetration portion exposing the grounding pattern.

The conductive member may cover the penetration portion.

The conductive member may contact the base member around the at least one grounding pattern.

The conductive member may contact the protective layer.

The conductive member may contact a side part of the chassis.

The conductive member may extend from the main FPC along the side part of the chassis to a bottom of the chassis or less.

The main FPC may have a first surface facing the liquid crystal panel, the liquid crystal panel and the PCB being connected to the first surface of the main FPC.

The liquid crystal panel may include a first surface facing the main FPC, the first surface of the main FPC being connected to the first surface of the liquid crystal panel.

The main FPC may have a predetermined width along a direction perpendicular to a direction connecting between the two end portions of the main FPC, the conductive member extending along and being equal to the predetermined width of the main FPC.

The conductive member may be separated from the PCB.

A portion of the main FPC may be exposed between the conductive member and PCB.

The liquid crystal display apparatus may further include a silicon member between a side surface of the liquid crystal panel and the main FPC.

The silicon member may be disposed between the conductive member and the liquid crystal panel, the silicon member contacting the side surface of the liquid crystal panel and the main FPC.

BRIEF DESCRIPTION OF THE DRAWINGS

The above and other features and advantages of the example embodiments will become more apparent by describing in detail exemplary embodiments thereof with reference to the attached drawings in which.

DETAILED DESCRIPTION

Hereinafter, example embodiments will be described in detail with reference to accompanying drawings.

Figure 1:
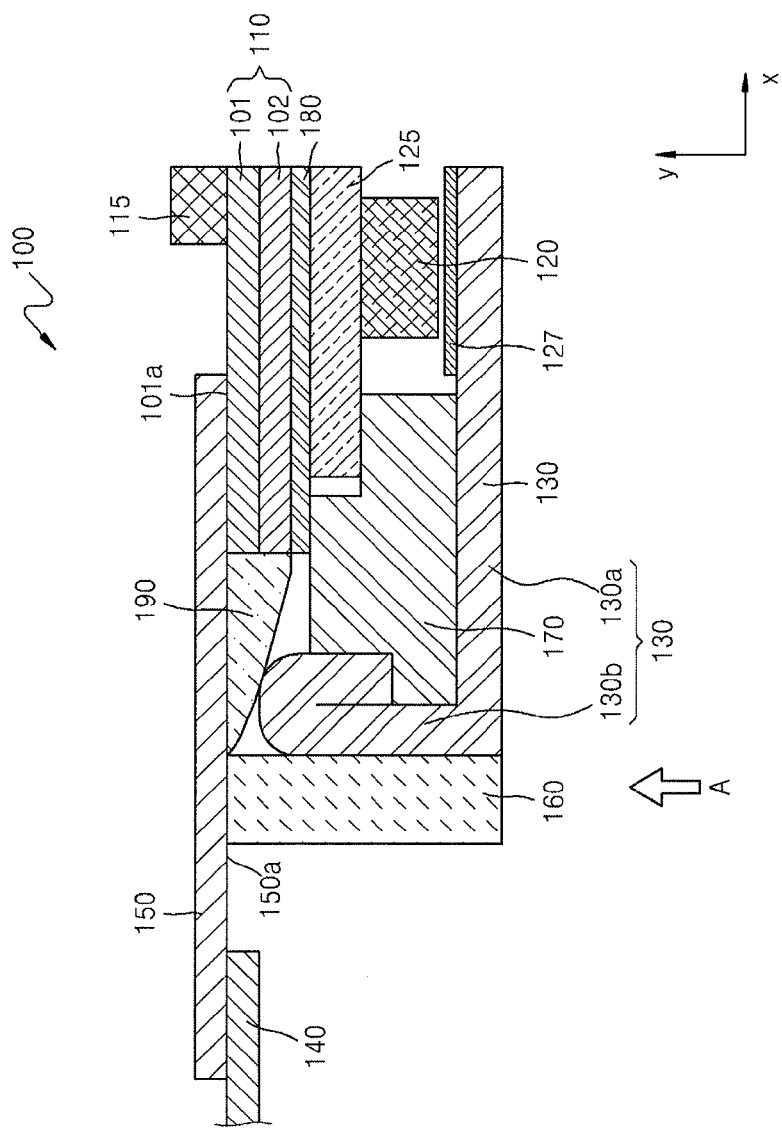
FIG. 1 is a schematic cross-sectional view of a liquid crystal display apparatus according to an embodiment.
Figure 2:
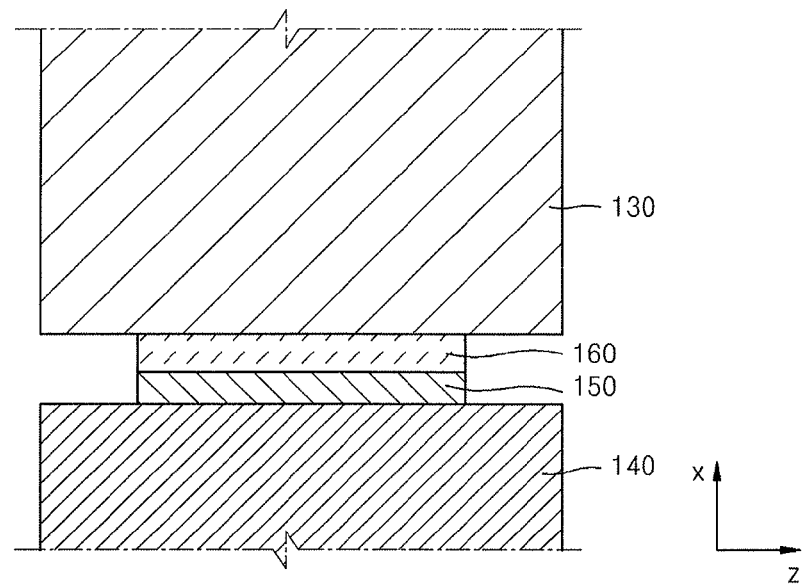
FIG. 2 is a plan view of the liquid crystal display apparatus in FIG. 1 seen from direction A.
Figure 3:
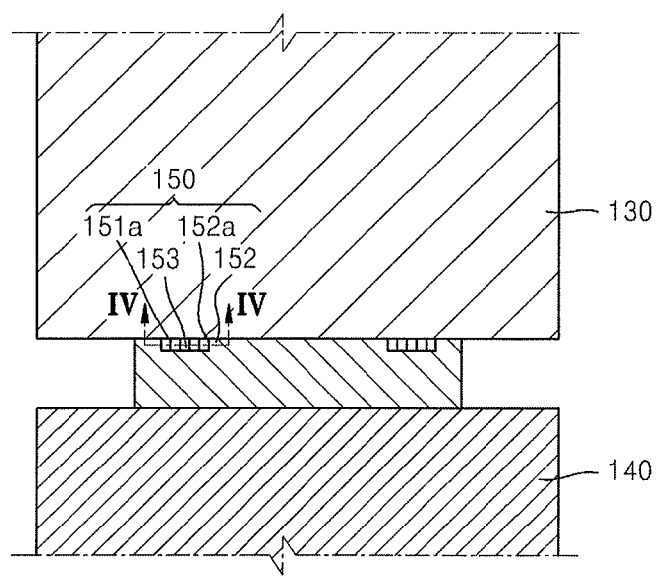
FIG. 3 is a plan view of the liquid crystal display apparatus in FIG. 2 from which a conductive member is removed.
Figure 4:
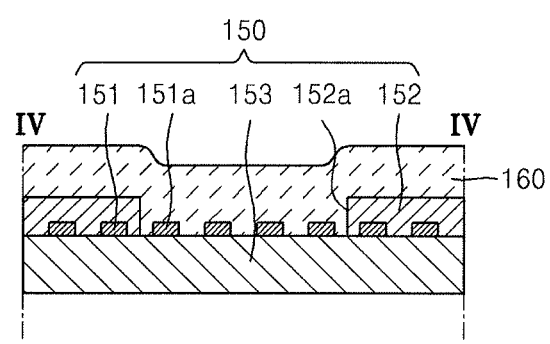
FIG. 4 is a cross-sectional view of the liquid crystal display apparatus taken along line IV-IV of FIG. 2.

FIG. 1 is a schematic cross-sectional view of a liquid crystal display apparatus 100 according to an embodiment, FIG. 2 is a plan view of the liquid crystal display apparatus 100 seen from a direction A of FIG. 1, FIG. 3 is a plan view of the liquid crystal display apparatus 100 shown in FIG. 2 from which a conductive member is removed, and FIG. 4 is a cross-sectional view of the liquid crystal display apparatus 100 taken along line IV-IV of FIG. 2.

Referring to FIG. 1, the liquid crystal display apparatus 100 includes a liquid crystal panel 110, a printed circuit board (PCB) 140, a chassis 130, a light source 120, a main flexible printed circuit board (FPC) 150, and a conductive member 160.

The liquid crystal panel 110 includes an upper substrate 101, a lower substrate 102, and liquid crystal. The liquid crystal (not shown) is disposed between the upper and lower substrates 101 and 102. For example, the upper and lower substrates 101 and 102 may be formed of a transparent glass material, e.g., mainly including $SiO_2$. In another example, the upper and lower substrates 101 and 102 may be formed of a transparent plastic material.

Although not shown in the drawings, a thin film transistor, a color filter, and a black matrix are formed on the upper and lower substrates 101 and 102. In more detail, signal lines such as data lines and gate lines are formed on the lower substrate 102, and the thin film transistor is formed on each portion where the data line and the gate line cross each other. In addition, a pixel electrode may be formed on a pixel region between the data line and the gate line, and a common electrode facing the pixel electrode may be formed on the upper substrate 101 or the lower substrate 102 according to a method of applying an electric field to the liquid crystal. A pad region to which each of the data line and the gate lines is connected is formed on a side portion of the lower substrate 102 or the upper substrate 101, and a driving integrated circuit (IC) 115 for applying a driving signal to the thin film transistor is mounted on the pad region. The driving IC 115 may be a gate driving IC or a data driving IC.

The PCB 140 generates various signals for driving the liquid crystal panel 110. The PCB 140 is separated from a side of the liquid crystal panel 110.

The driving IC 115 supplies various signals to the data lines or the gate lines of the liquid crystal panel 110 in response to a control signal generated by the PCB 140. The driving IC 115 may be formed in a various methods, e.g., a chip on glass (COG) method.

An end portion of the main FPC 150 is connected to the liquid crystal panel 110, and the other end portion 150 is connected to the PCB 140, i.e., the liquid crystal panel 110 and the PCB 140 are connected to opposite ends of the main FPC 150. In more detail, an end portion of the main FPC 150 and a pad electrode of the driving IC 115 are electrically connected to each other via an anisotropic conductive film (ACF).

In addition, the main FPC 150 includes a lower surface, i.e., a first surface 150a, so the liquid crystal panel 110 and the PCB 140 are connected to the first surface 150a. In detail, the liquid crystal panel 110 has a first surface 101a on an upper portion thereof, i.e., an uppermost surface of the upper panel 101 facing the main FPC 150, so the first surface 101a of the liquid crystal panel 110 is connected to the first surface 150a of the main FPC 150.

The chassis 130 is disposed on a rear portion of the liquid crystal panel 110, e.g., the liquid crystal panel 110 may be between the chassis 130 and the main FPC 150. The chassis 130 functions as a case and a protective member of the liquid crystal display apparatus 100.

The light source 120 is disposed between the chassis 130 and the liquid crystal panel 110. The light source 120 irradiates light toward the liquid crystal panel 110. The light source 120 may be formed as a line light source type or a point light source type. In addition, the light source 120 may be a light emitting diode (LED) emitting white light, a cold cathode fluorescent lamp (CCFL), or other various light sources.

A reflective plate 127 is formed between the light source 120 and the chassis 130. The reflective plate 127 reflects light generated from the light source 120 toward the liquid crystal panel 110 so as to improve optical efficiency of the liquid crystal panel 110. Although not shown in the drawings, a light guide plate (not shown) may be further disposed around the light source 120 so as to guide the light emitted from the light source 120.

A light source FPC 125 is disposed on an end portion of the light source 120 to supply a driving voltage to the light source 120.

An optical sheet 180 is disposed between the light source 120 and the liquid crystal panel 110. The optical sheet may be one of a reflective sheet, a prism sheet, a diffusion sheet, and other various sheets, or a combination of a plurality of the sheets. The light emitted from the light source 120 may be effectively transferred to the liquid crystal panel 110 through the optical sheet 180.

A mold frame 170 is disposed around the light source 120. The mold frame 170 is used to fix the liquid crystal panel 110, and may be formed, e.g., as a square-like frame. The mold frame 170 is formed of a resin material that may be melted, and may be integrally formed with the chassis 130 through an injection process.

The chassis 130 may include a bottom part 130a and a side part 130b, e.g., perpendicular to the bottom part 130a, so the chassis 130 receives and protects the liquid crystal panel 110 and the light source 120 together with the mold frame 170. An end portion of the chassis 130 may be hemmed, so as to improve durability of the chassis 130 and a coupling force between the chassis 130 and the mold frame 170.

The conductive member 160 is disposed to be connected to a side surface of the chassis 130 and a grounding pattern 151a (FIG. 3) of the main FPC 150. For example, the conductive member 160 may extend along the y-axis, while the liquid display panel 110 may extend along the x-axis. Here, the conductive member 160 may not exceed the side part 130b of the chassis 130, e.g., the conductive member 160 may not extend along the y-axis beyond the bottom part 130a of the chassis 130. Thus, a thickness of the liquid crystal display apparatus 100 is not increased.

A width of the conductive member 160 along the x-axis may be adjusted variously. For example, the conductive member may be spaced apart from the PCB 140 along the x-axis, so the conductive member 160 and the PCB 140 do not contact each other. That is, as shown in FIGS. 1 and 2, the conductive member 160 is separated a predetermined distance from the PCB 140.

The conductive member 160 may be formed of various materials and in various shapes. For example, the conductive member 160 may be formed as a tape. Thus, the conductive member 160 easily contacts the chassis 130 and the main FPC 150. In particular, the conductive member 160 easily contacts the grounding pattern 151a of the main FPC 150. Connection between the conductive member 160 and the grounding pattern 151a will be described later.

In another example, the conductive member 160 may be formed of a conductive paste. That is, the conductive paste is disposed to contact the side part 130b of the chassis 130 and the grounding pattern 151a of the main FPC 150, and then, dried to form the conductive member 160 at a solid state.

The conductive member 160 is elongated in a predetermined direction. That is, as shown in FIG. 2, the conductive member 160 is formed to have a length along the z-axis corresponding to a width of the main FPC 150 in a same direction, i.e., along the z-axis. In more detail, the conductive member 160 is formed so that the length corresponds to a width of the main FPC 150 in a direction that is perpendicular to a direction connecting an end portion contacting the liquid crystal panel 110 and the other end contacting the PCB 140.

Since the conductive member 160 is formed to be sufficiently long to correspond to the width of the main FPC 150 in a certain direction, e.g., the conductive member 160 and the main FPC 150 may overlap each other, the conductive member 160 effectively supports the main FPC 150. As such, the conductive member 160 prevents the main FPC 150 from being torn or damaged, thereby improving the durability of the main FPC 150.

The connection between the conductive member 160 and the grounding pattern 151a of the main FPC 150 will be described in detail as follows. For the convenience of description, the conductive member 160 is not shown in FIG. 3.

As shown in FIG. 4, the main FPC 150 includes a base member 153, a wiring pattern 151, and a protective layer 152. The wiring pattern 151 includes the grounding pattern 151a, and the protective layer 152 includes a penetration portion 152a.

The base member 153 may be formed as a film by using an insulating material, such as polyimide. A plurality of wiring patterns 151 are formed on the base member 153, and each of the wiring patterns 151 includes one or more grounding patterns 151a.

The protective layer 152 is formed on the wiring patterns 151 by using an insulating material. The protective layer 152 includes a penetration portion 152a having a predetermined size. The penetration portion 152a is formed to correspond to the grounding pattern 151a, e.g., the penetration portion 152a exposes the grounding pattern 151a, so the grounding pattern 151a is not covered by the protective layer 152.

The conductive member 160 is disposed to cover the penetration portion 152a, and thus the conductive member 160 contacts the grounding pattern 151a. Since the conductive member 160 is formed as a tape or formed of a conductive paste, the conductive member 160 contacts the grounding pattern 151a with flexibility, and then an adhering force between the conductive member 160 and the grounding pattern 151a may be improved.

Referring to FIG. 3, the protective layer 152 includes two penetration portions 152a. That is, in the present embodiment, two grounding patterns 151a are formed, and two penetration portions 152a corresponding to the grounding patterns 151a are formed. However, the example embodiments are not limited thereto. That is, the number of the grounding patterns 151a may be variously set, and the number of the penetration portions 152a may also vary depending on the number of the grounding patterns 151a.

As shown in FIG. 4, the conductive member 160 contacts the base member 153 and the protective layer 152, as well as the grounding patterns 151a. Thus, the coupling force between the conductive member 160 and the main FPC 150 may be improved. In addition, the supporting effect of the conductive member 160 with respect to the main FPC 150 is increased, and thus the durability of the main FPC 150 is also improved.

In addition, the conductive member 160 is formed to have a width that may cover the penetration portions 152a as shown in FIGS. 2 and 4. Therefore, the grounding patterns 151a may not be exposed to outside via the penetration portions 152a, and accordingly, contamination or damage of the grounding patterns 151a may be prevented.

Referring back to FIG. 1, a silicon member 190 is formed to contact the side surface of the liquid crystal panel 110 and the main FPC 150. In detail, the silicon member 190 is formed on the first surface 150a of the main FPC 150, and is disposed between the conductive member 160 and the liquid crystal panel 110. The silicon member 190 may contact the conductive member 160 and the chassis 130.

In the liquid crystal display apparatus 100 according to the present embodiment, the conductive member 160 is formed to contact the side part 130b of the chassis 130 and the grounding patterns 151a of the main FPC 150. The conductive member 160 functions as a path for static electricity or for other electromagnetic waves. Thus, defects of the liquid crystal display apparatus 100 caused by the static electricity may be prevented. In particular, static electricity generated around the PCB 140 or the main FPC 150 may be diverted via the conductive member 160, thereby preventing or substantially minimizing potential defects around the PCB 140 or the main FPC 150.

In addition, since the conductive member 160 is formed on the grounding patterns 151a in a state where the conductive member 160 is flexible, e.g., due to its shape of a tape or a paste, the adhering force between the conductive member 160 and the grounding patterns 151a is improved. Thus, conductive member 160 effectively functions as the path of the static electricity.

In addition, the grounding patterns 151a for the grounding are not disposed on an additional member, but disposed in the wiring patterns 151 of the main FPC 150. Therefore, the fabrication processes may be simple and integration effect of the liquid crystal display apparatus 100 is improved. Further, since the grounding patterns 151a are exposed via the penetration portions 152a and the penetration portions 152a are covered by the conductive member 160, the grounding patterns 151a are not exposed to outside and may not be damaged.

In addition, the conductive member 160 simultaneously contacts the chassis 130 and the main FPC 150, and thus, the conductive member 160 may support the main FPC 150 so that the durability of the main FPC 150 is improved. In particular, the conductive member 160 is elongated so as to correspond to the width of the main FPC 150, and thus, the conductive member 160 effectively supports the main FPC 150, and thereby improving the durability of the main FPC 150.

Figure 5:
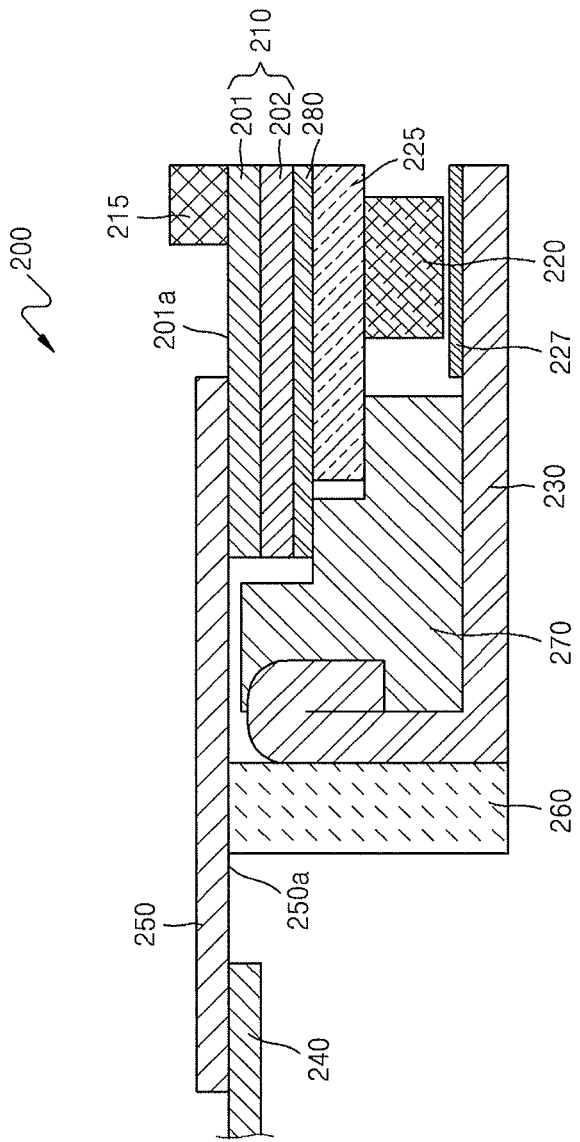
FIG. 5 is a schematic cross-sectional view of a liquid crystal display apparatus according to another embodiment.

FIG. 5 is a schematic cross-sectional view of a liquid crystal display apparatus 200 according to another embodiment. For the convenience of description, elements that are different from those of the previous embodiment will be described as follows.

Referring to FIG. 5, the liquid crystal display apparatus 200 includes a liquid crystal panel 210, a PCB 240, a chassis 230, a light source 220, a main FPC 250, and a conductive member 260. The liquid crystal panel 210 includes an upper substrate 201, a lower substrate 202, and liquid crystal disposed between the upper and lower substrates 201 and 202. A driving IC 215 is mounted on a side portion of the liquid crystal panel 210.

A reflective plate 227 is formed between the light source 220 and the chassis 230. A light source FPC 225 is disposed on an end portion of the light source 220 and supplies a driving power to the light source 220. An optical sheet 280 is disposed between the light source 220 and the liquid crystal panel 210. A mold frame 270 is disposed around the light source 220.

The conductive member 260 is disposed so as to be connected to a side surface of the chassis 230 and a grounding pattern (not shown) of the main FPC 250. The conductive member 260 has the same structure as that of the previous embodiment, and thus, detailed descriptions are not provided here.

Unlike the liquid crystal display apparatus 100 shown in FIG. 1, the liquid crystal display apparatus 200 of the present embodiment does not include the silicon member 190. Therefore, fabrication processes of the liquid crystal display apparatus 200 are simplified, and generation of impurities, which may occur when the silicon member is formed, may be prevented. It is noted that the mold frame 270 may be larger than the mold 170 in FIG. 1, and may occupy a space of the silicon member 190 of FIG. 1. Thus, the coupling force between the mold frame 270 and the chassis 230 may be improved.

According to the liquid crystal display apparatus of the example embodiments, defects caused by static electricity may be prevented and the durability of the apparatus may be improved. In contrast, a liquid crystal display apparatus without a conductive member may have defects caused by the static electricity generated on the PCB, i.e., generates signals for driving the liquid crystal panel, and the FPC, on which a plurality of wires are formed, thereby exhibiting reduced quality.

While the example embodiments has been particularly shown and described with reference to exemplary embodiments thereof, it will be understood by those of ordinary skill in the art that various changes in form and details may be made therein without departing from the spirit and scope of the example embodiments as defined by the following claims.

What is claimed is:

1. A liquid crystal display apparatus, comprising:
   a liquid crystal panel;
   a printed circuit board (PCB) configured to generate driving signals for driving the liquid crystal panel;
   a chassis disposed on the liquid crystal panel;
   a light source disposed between the liquid crystal panel and the chassis;
   a main flexible printed circuit board (FPC) having a first end connected to the liquid crystal panel and a second end connected to the PCB, the main FPC including at least one grounding pattern between the liquid crystal panel and the PCB; and
   a conductive member contacting the chassis and the at least one grounding pattern.

2. The liquid crystal display apparatus of claim 1, wherein the conductive member is a tape.

3. The liquid crystal display apparatus of claim 1, wherein the conductive member is a dried conductive paste.

4. The liquid crystal display apparatus of claim 1, wherein the main FPC includes:
   the at least one grounding pattern on a base member; and
   a protective layer on the at least one grounding pattern, the protective layer having a penetration portion exposing the grounding pattern.

5. The liquid crystal display apparatus of claim 4, wherein the conductive member covers the penetration portion.

6. The liquid crystal display apparatus of claim 4, wherein the conductive member contacts the base member around the at least one grounding pattern.

7. The liquid crystal display apparatus of claim 4, wherein the conductive member contacts the protective layer.

8. The liquid crystal display apparatus of claim 1, wherein the conductive member contacts a side part of the chassis.

9. The liquid crystal display apparatus of claim 1, wherein the conductive member extends from the main FPC along the side part of the chassis to a bottom of the chassis or less.

10. The liquid crystal display apparatus of claim 1, wherein the main FPC has a first surface facing the liquid crystal panel, the liquid crystal panel and the PCB being connected to the first surface of the main FPC.

11. The liquid crystal display apparatus of claim 10, wherein the liquid crystal panel includes a first surface opposite to a direction toward the light source, and the first surface of the main FPC is connected to the first surface of the liquid crystal panel.

12. The liquid crystal display apparatus of claim 1, wherein the main FPC has a predetermined width along a direction perpendicular to a direction connecting between the two end portions of the main FPC, the conductive member extending along and being equal to the predetermined width of the main FPC.

13. The liquid crystal display apparatus of claim 1, wherein the conductive member is separated from the PCB.

14. The liquid crystal display apparatus of claim 13, wherein a portion of the main FPC is exposed between the conductive member and PCB.

15. The liquid crystal display apparatus of claim 1, further comprising a silicon member between a side surface of the liquid crystal panel and the main FPC.

16. The liquid crystal display apparatus of claim 15, wherein the silicon member is disposed between the conductive member and the liquid crystal panel, the silicon member contacting the side surface of the liquid crystal panel and the main FPC.

* * * * *